United States Patent
McCauley et al.

(10) Patent No.: US 10,688,682 B2
(45) Date of Patent: Jun. 23, 2020

(54) DEBARKING CHAIN HAVING BENT LINKS

(71) Applicant: PEERLESS CHAIN COMPANY, Winona, MN (US)

(72) Inventors: John J. McCauley, Winona, MN (US); Matthew Fitzgerald, Winona, MN (US)

(73) Assignee: Peerless Chain Company, Winona, MN (US)

( * ) Notice: Subject to any disclaimer, the term of this patent is extended or adjusted under 35 U.S.C. 154(b) by 0 days.

(21) Appl. No.: 15/748,554

(22) PCT Filed: Aug. 3, 2016

(86) PCT No.: PCT/US2016/045387
§ 371 (c)(1),
(2) Date: Jan. 29, 2018

(87) PCT Pub. No.: WO2017/027297
PCT Pub. Date: Feb. 16, 2017

(65) Prior Publication Data
US 2018/0222079 A1    Aug. 9, 2018

(51) Int. Cl.
*B27L 1/12* (2006.01)
*A01G 23/095* (2006.01)
(Continued)

(52) U.S. Cl.
CPC .............. *B27L 1/12* (2013.01); *A01G 23/095* (2013.01); *B27L 1/10* (2013.01); *F16G 13/18* (2013.01)

(58) Field of Classification Search
CPC .............. B27L 1/00; B27L 1/12; B27L 1/122
See application file for complete search history.

(56) References Cited

U.S. PATENT DOCUMENTS

| 1,548,273 A | 8/1923 | Lester |
| 1,530,940 A | 3/1925 | Herman |
| (Continued) | | |

FOREIGN PATENT DOCUMENTS

| AU | 2009200745 A1 | 9/2010 |
| CN | 101564857 A | 10/2009 |
| (Continued) | | |

OTHER PUBLICATIONS

ISA/US, PCTUS2010034143 ISR and Written Opinion, dated Jul. 19, 2010, USPTO, Alexandria VA, USA.
(Continued)

*Primary Examiner* — Matthew Katcoff
(74) *Attorney, Agent, or Firm* — Robert C. Freed; Dykema Gossett PLLC

(57) ABSTRACT

A debarking chain having bent links; the bent links being bent either right or left, from end to end at a bend angle of from about 5 to about 90 degrees to provide a flail type debarking chain having protruding edges or corners that increase the efficiency in which bark is removed from logs during debarking operations. Bent link chains include right bent links that are bent to the right proximate the middle of the link, where the weld is preferably located, when the link is viewed from the side with the weld on the far side and left bent links that are bent to the left proximate the middle of the link, where the weld is preferably located, when the link is viewed from the side with the weld on the far side. Disclosed inventions also include a debarking drum having a plurality of debarking chains having at least two bent links, as well as debarking devices having such a debarking drum and methods of making and using the same. The debarking device preferably includes a chipping device and methods of using the same in conjunction with using such bent link debarking chain.

27 Claims, 11 Drawing Sheets

(51) Int. Cl.
  *B27L 1/10* (2006.01)
  *F16G 13/18* (2006.01)

(56) References Cited

U.S. PATENT DOCUMENTS

| | | |
|---|---|---|
| 1,552,498 A | 9/1925 | Noyes |
| 1,567,505 A | 12/1925 | Holmes |
| 1,593,167 A | 7/1926 | Frambach |
| 1,594,085 A | 7/1926 | Wills |
| 1,621,287 A | 3/1927 | Speidel |
| 1,670,723 A | 5/1928 | Hummel |
| 1,972,692 A | 9/1934 | Paget et al. |
| 2,001,227 A | 1/1935 | Vogel-Jorgensen |
| 2,069,980 A | 2/1937 | Stahl |
| 2,125,967 A | 8/1938 | Winthrop et al. |
| RE20,892 E | 10/1938 | Bambenek et al. |
| 2,171,995 A | 9/1939 | Schmidt, Jr. |
| 2,190,130 A | 2/1940 | Stahl |
| 2,520,421 A | 8/1950 | Mathewson et al. |
| 2,785,578 A | 3/1957 | Nold |
| 2,795,320 A | 6/1957 | Dillingham |
| 2,831,317 A | 4/1958 | Watkins |
| 2,867,252 A | 1/1959 | Dillingham |
| 2,876,812 A | 3/1959 | Waldron |
| 2,966,878 A | 1/1961 | Feiser, Jr. |
| 3,135,504 A | 6/1964 | Chisler |
| 3,425,213 A | 2/1969 | Roselman |
| 3,427,801 A | 2/1969 | McLeish |
| 3,435,861 A | 4/1969 | Shields |
| 3,820,817 A | 6/1974 | Harold |
| 3,830,054 A | 8/1974 | Tamamaura et al. |
| 3,862,653 A | 1/1975 | Fay et al. |
| 4,011,715 A | 3/1977 | Graetz |
| 4,012,618 A | 3/1977 | Ebel et al. |
| 4,075,451 A | 2/1978 | Wust |
| 4,110,971 A | 9/1978 | Bruce |
| 4,222,418 A | 9/1980 | McCray et al. |
| 4,572,258 A | 2/1986 | Mischel |
| 4,640,325 A | 2/1987 | Vaders |
| 4,660,611 A | 4/1987 | Gockley et al. |
| 4,690,187 A | 9/1987 | Schmidt |
| 4,711,280 A | 12/1987 | Schmidt |
| 4,738,292 A | 4/1988 | Turpeinen |
| 4,827,821 A | 5/1989 | Scott et al. |
| 5,148,844 A | 9/1992 | Robison |
| 5,322,104 A | 6/1994 | Morey et al. |
| 5,343,912 A | 9/1994 | Chronister et al. |
| 5,349,999 A | 9/1994 | Peterson et al. |
| 5,419,379 A | 5/1995 | Schmidt |
| 5,511,596 A | 4/1996 | Wardell, Jr. et al. |
| 5,537,812 A | 7/1996 | Rozenwasser |
| 5,638,879 A | 6/1997 | Robison et al. |
| 5,660,036 A | 8/1997 | Rozenwasser |
| 5,738,329 A | 4/1998 | Woodard |
| 6,256,974 B1 | 7/2001 | Shanks, Sr. |
| 6,460,323 B1 | 10/2002 | Rozenwasser et al. |
| 7,207,162 B2 | 4/2007 | Defner |
| 7,310,934 B1 | 12/2007 | Jensen et al. |
| D560,602 S | 1/2008 | Neri et al. |
| 7,878,227 B2 | 2/2011 | Jensen et al. |
| 8,186,141 B2 | 5/2012 | Cerjak et al. |
| 8,210,217 B2 | 7/2012 | Jensen et al. |
| 9,102,075 B2 | 8/2015 | Jensen et al. |
| 2004/0060203 A1 | 4/2004 | Briscoe |
| 2004/0093848 A1 | 5/2004 | Dudley et al. |
| 2008/0148705 A1 | 6/2008 | Deffner |
| 2010/0212783 A1 | 8/2010 | McCauley et al. |

FOREIGN PATENT DOCUMENTS

| | | |
|---|---|---|
| DE | 41 09 704 A1 | 1/1992 |
| EP | 0597816 A2 | 5/1994 |
| FR | 1336076 A | 8/1963 |
| GB | 311946 | 5/1929 |
| GB | 886895 | 1/1962 |
| GB | 2233260 A | 1/1991 |
| SU | 1421428 A1 | 9/1988 |
| WO | WO-2006121574 A2 | 11/2006 |
| WO | WO-2010129935 A1 | 11/2010 |

OTHER PUBLICATIONS

ISA/US, PCT/US2016/045387 International Search Report and Written Opinion, dated Oct. 26, 2016, USPTO, Alexandria VA, USA.

DEBARKING CHAIN HAVING BENT LINKS

FIELD OF THE INVENTION

The present invention relates to devices used for the removal of bark and limbs from logs, more specifically, to a debarking chain apparatus and to debarking chains used to remove bark and limbs from such logs; wherein the debarking chains are preferably flail-type debarking chains that include at least one bent link, preferably at least two interconnected bent links. In preferred embodiments all of the links will be bent links. The invention also relates to methods for making and using such debarking chains and flail-type debarking devices.

BACKGROUND OF THE INVENTION

It is well known that bark and small limbs can be removed from logs in a debarking device by passing the log between a set of rapidly rotating, upper and lower debarking drums in the debarking device, each of which have a plurality of debarking chains, also called flail chains. The debarking chains repetitively strike the surface of the log with significant force at a high rate of speed, generally from about 250 to as much as 500 revolutions per minute (rpm), or more, effectively tearing away any small limbs and most of the bark, preferably virtually all of the bark, from logs passing through a debarking device in preparation for a chipping operation in which the log is chipped into small wood chips appropriate for further processing in such applications as wood pulp for paper manufacturing, manufacturing of composite products such as chip board, oriented strand board and engineered lumber or further processing for use as biofuels.

During debarking operations, logs are conveyed lengthwise through a debarking device along a predetermined feed plane (see FIG. 1). The upper drum is located above the feed plane and the lower drum is located below the feed plane, each at a distance from the feed plane to allow the debarking chains, or flail chains, together to clear bark and limbs from a majority if not the entire surface of the log. It will be appreciated that each set of debarking chains, associated with respective debarking drums, will preferably reach at least the midpoint of the sides of the log. Some debarking devices have additional debarking drums some of which are fixed drums and some of which may be "floating" drums.

It will be appreciated that in prior designs, debarking chains have generally consisted of a series of oblong chain links that have a limited wear life based primarily upon to the wear that occurs proximate the U-shaped end portions of the respective oblong chain links as those links repetitively whipped about a drum rotating at speed that can exceed 500, 600 or even 750 revolutions per minute (rpm) and repetitively strike the outer surface of the logs. During this process, the links will strike the logs and strike each other as the links recoil following such impacts. The wear life that is projected for each chain dictates frequency of chain replacement on each of the debarking drums. Such replacement requires operators to stop the debarking apparatus for the time required to remove the chains and flip them end for end or replace them with new chains. This creates downtime in which revenue from the production of wood chips that can be sold in open markets for such chips, cannot be generated. Operators typically try to keep a debarking apparatus running as close as possible to 24 hours a day to maximize the return on the investment that is made in the machinery and look upon any potential downtime as a limitation on their ability to maximize this return on investment. For that reason, it will be appreciated that any extension of the projected wear life of a set of debarking chains will maximize this return on investment for debarking operations because any extended use of the debarking chains over the projected wear life generally associate with standard debarking chain will not only reduce the number of chains used per unit of logs debarked or wood chips generated, but also reduce the downtime required to replace a set of debarking chains when compared to effective run time.

In normal use, a set of debarking chains are generally attached to a debarking drum, used for an amount of time based on a projected wear life based on historical use under similar conditions or until links break or are worn to a predetermined amount of wear near the point of breakage based on periodic inspection of the debarking chain. When a determination is made that the chains should be flipped end for end or changed out, then the engines are turned off or idled, the chains are all disconnected, and either flipped end for end, before being reattached and used again, or removed and changed out for another set of chains.

Furthermore, even when an operator's projections are appropriate for such chain, chain links from one source or another may have defects that lead to breakage that is premature and therefore unpredictable, which can reduce an operators willingness to place reliance on chain from such a source. It will be appreciated that while an operators ability to predict how long a debarking apparatus can continue to operate without stopping the machines to flip or replace the chains is important, the operator may also try to maximize the amount of wood chips that a produced with any one set of debarking chains, which gives the operator an incentive to maximize the length of time that a set of debarking chains are used. As operators know, however, the downside to stretching the amount of time that a set of debarking chains is used beyond the projected wear life creates an additional risk that a chain will break and go into the chipper that generally follows the debarking drums. If the chains break and go into the chipper they may cause significant damage to the knives in the chipper and reduce the efficiency of the chipper so that repairs to the chipper are required, creating further expense and resulting in further downtime when revenue from wood chip production is not generated.

It is also important to appreciate that the quality of the debarking process is especially important in debarking/chipping operations, because effective debarking will minimize the residual amount of bark mixed into wood chips from subsequent chipping operations. Because wood chips containing even a little bark are much less desirable for downstream use of the chips such as, for instance, pulping operations, operators are docked by buyers of the wood chips for wood chips that contain any amount of bark.

As noted above, a greater fear in debarking/chipping operations is that the debarking chains will break and damage the chipper. This is one of the key reasons that operators carefully avoid extending the use of a set of debarking chains beyond the projected wear life for the chains. If any of the chains break and any of the metal links pass into the chipper, which is generally operating at a very high rate of speed, any consequent damage to the teeth or cutting blades in the chipper can result in added operating costs due to machine downtime and needed replacement parts for needed repairs. Additionally, there exists the risk that breaking links may cause link debris to enter adjacent machinery, causing further damage and downtime.

For these and other reasons, it will be appreciated that there is a practical need to increase projected debarking chain wear life, thereby reducing chain replacement cost per unit of processed wood products.

SUMMARY OF THE INVENTION

The present invention includes a debarking chain configured for attachment to a debarking drum; the debarking chain including a plurality of interconnected chain links, each chain link being a continuous strand of chain material surrounding and defining a central opening through which the continuous strands of any adjacent interconnected chain links pass. The plurality of interconnected chain links preferably include at least two bent links, preferably at least two adjacent bent links. In preferred embodiments the debarking chain is configured for attachment to a debarking drum of a flail-type debarking machine; the debarking chain including a plurality of interconnected chain links including two end links and a plurality of intermediate links that interconnect with each other and the respective end links in series so that each of the end links are interconnected only with a single intermediate link; the debarking chain having first and second ends; each chain link being a continuous strand of chain material surrounding and defining a central opening through which the continuous strand of chain material of any adjacent, interconnected chain link passes; the plurality of interconnected chain links including at least two bent links; wherein each of the bent links have first and second opposing end sections spaced apart from one another by first and second side sections of the continuous strand of chain material; wherein each of the first and second opposing end sections reside generally within a plane; the first end section residing generally within a first plane and the second end section residing generally within a section plane; wherein each of the respective bent links is bent proximate both of the respective side sections such that the first plane resides at a bend angle to the second plane of from about 5 to about 90 degrees. In preferred embodiments, the bent links are selected from the group consisting of generally oblong links, generally square links and generally round links. In alternate embodiments, the bent links are selected from the group consisting of passing links and non-passing links. The debarking chain will preferably include at least two bent links interconnected in series with one another; preferably from about 3 to about 12, more preferably from about 4 to about 10. The bent links will preferably include links selected from the group consisting of right bent links and left bent links, wherein the first side section of each of bent link includes a weld portion positioned between first and second opposing end sections, wherein the weld portion is positioned to the right of the first end section and to the left of the second end section when the first side section is in a generally horizontal orientation and the first end section is position closest to a first end of the chain and the second end section is position closest to a second end of the chain; wherein both of the respective opposing end sections of a right bent link extend away from the weld portion to the right of the weld portion when the first side section and the second side section are oriented in a generally vertical orientation and the first end section and the first end are positioned above the weld portion and the second end section and the second end are position below the weld portion; and wherein both of the respective opposing end sections of a left bent link extend away from the weld portion to the left of the weld portion when the first side section and the second side section are oriented in a generally vertical orientation and the first end section and the first end are positioned above the weld portion and the second end section and the second end are position below the weld portion.

In preferred embodiments, the debarking chain can include a plurality of right bent links, a plurality of left bent links or a mixture of the two in which the direction of the bend in the bent links alternates. In other embodiments, the plurality of intermediate links will preferably include at least two bent links; wherein each of the bent links have first and second opposing end sections spaced apart from one another by first and second side sections of the continuous strand of chain material; wherein each of the first and second opposing end sections reside generally within a plane; the first end section residing generally within a first plane and the second end section residing generally within a section plane; wherein each of the respective bent links is bent proximate each of the respective side sections such that the first plane resides at an included angle to the second plane of from about 175 degrees to about 90 degrees, which corresponds to a bend angle of from about 5 to about 90 degrees.

In various embodiments, the debarking chain will also include at least one drum attachment chain link; the drum attachment chain link being at a first end of a debarking drum and being constructed and arranged to be secured to the debarking drum. The debarking chain may have a drum attachment chain link at each end of the debarking chain that fits within an opening in an outer surface of the debarking drum in which an end link of a debarking chain can be inserted and secured in existing debarking drums. In preferred embodiments the debarking chain will be a flail-type debarking chain. Alternatively, debarking chains having all links being bent links, even the attachment chain links, are preferred as it is believed that the bent link debarking chains of the present invention can be used with most of the debarking drums available in the market at the time of the invention. The present invention also includes a debarking drum including a plurality of such debarking chains, as well as a debarking device having a debarking drum of the type disclosed above, preferably a plurality of such debarking drums. In preferred embodiments, this device will also include or be associated with a chipping device constructed and arranged to chip a wood log into small wood chips suitable for further processing in the pulp or composite lumber industries, respectively. It will be appreciated that it is important to remove bark from such logs prior to the chipping operation in such a process. The present invention also includes methods for making and using such debarking chain and debarking devices.

These and various other advantages and features of novelty which characterize the present invention are pointed out with particularity in the claims annexed hereto and forming a part hereof. However, for a better understanding of the invention, its advantages and objects obtained by its use, reference should be made to the drawings which form a further part hereof, and to the accompanying descriptive matter, in which there is illustrated and described a preferred embodiment of the present invention.

BRIEF DESCRIPTION OF THE DRAWINGS

In the drawings, in which corresponding reference numerals and letters indicate corresponding parts of the various embodiments throughout the several views, and in which the various embodiments generally differ only in the manner described and/or shown:

FIG. 3 is a perspective view of a debarking drum 214a of the present invention showing a shaft 215a about which the drum 214a rotates and showing six rods 227 that can be removed from openings 229 in the hub 228 of the drum 214a for receiving a rod 227, so that debarking chains 230 can be secured to the drum 214a by passing a rod 227 through the central opening of the first link 234 at the first end 236a of the chain 230 after passing the first link 234 through an opening or a pocket 218 in the cylindrical plate surface 216 of the drum 214a; and wherein the debarking chain 230 can be detached from the debarking drum 214a by sliding a rod 227 out of the drum 114a so as to release any debarking chains 230 secured to the rod and then replacing the respective chains 230 with new chains or flipping the chains that are taken off the drum 114a in this way and then flipping the chains end for end and resecuring the flipped chains to the drum 114a;

DETAILED DESCRIPTION OF THE PREFERRED EMBODIMENTS

Figure 1:
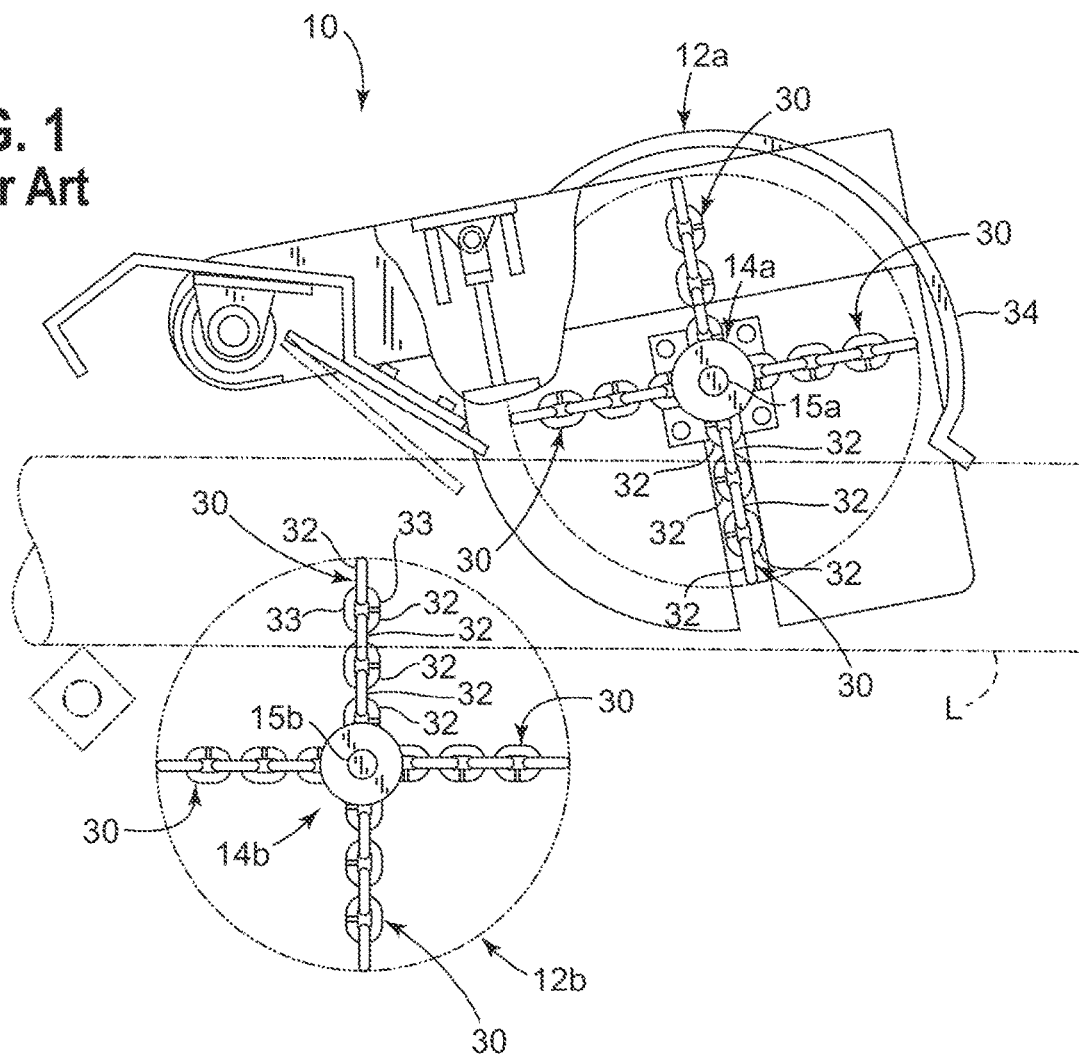
FIG. 1 is a side elevation view providing a schematic illustration of a "prior art" debarking/delimbing apparatus 10 having flail-type debarking chains 30.

As noted above, debarking devices are commonly used in the wood pulp and composite lumber industries to remove bark and small limbs from the surface of a log prior to chipping the log. As illustrated in the prior art illustration of FIG. 1, one known embodiment of a debarking/delimbing apparatus 10 includes upper and lower debarking units 12a and 12b, respectively, having a plurality of debarking chains 30. Each debarking chain 30 is constructed of multiple standard oblong chain links 32, which are used to flail the surface of a log L to remove bark and small limbs.

In many cases, such prior art devices will include additional debarking units (not shown) spaced away from the first two debarking units 12a, 12b. In many cases, the upper debarking unit 12a is a "floating" unit and the lower unit 12b is in a fixed position, as these respective debarking units 12a, 12b are. The term "floating" is used to describe a self-adjusting ability. As logs L of different diameters are inserted into the debarking apparatus 10, the upper debarking unit 12a will pivot up or down in order to accept the log L while still remaining close enough to the log L in order to debark/delimb the log L. Each debarking unit 12a, 12b generally includes a debarking drum 14a, 14b having a cylindrical plate (not shown) similar to a cylindrical plate 216 shown in a debarking drum 214a of the present invention illustrated in FIG. 3, in which the plate 216 has a series of chain receiving openings or pockets 218 in which an end link 234 of each debarking chain 230 can be received and subsequently secured by a securing rod 227, secured by various means known in the art within openings 229 within a hub or hubs 228 of the drum 214a. The debarking drums 14a, 14b, include a rotating shaft 15a, 15b that permit the debarking drums 14a, 14b to rotate relative to a housing.

Figure 2:
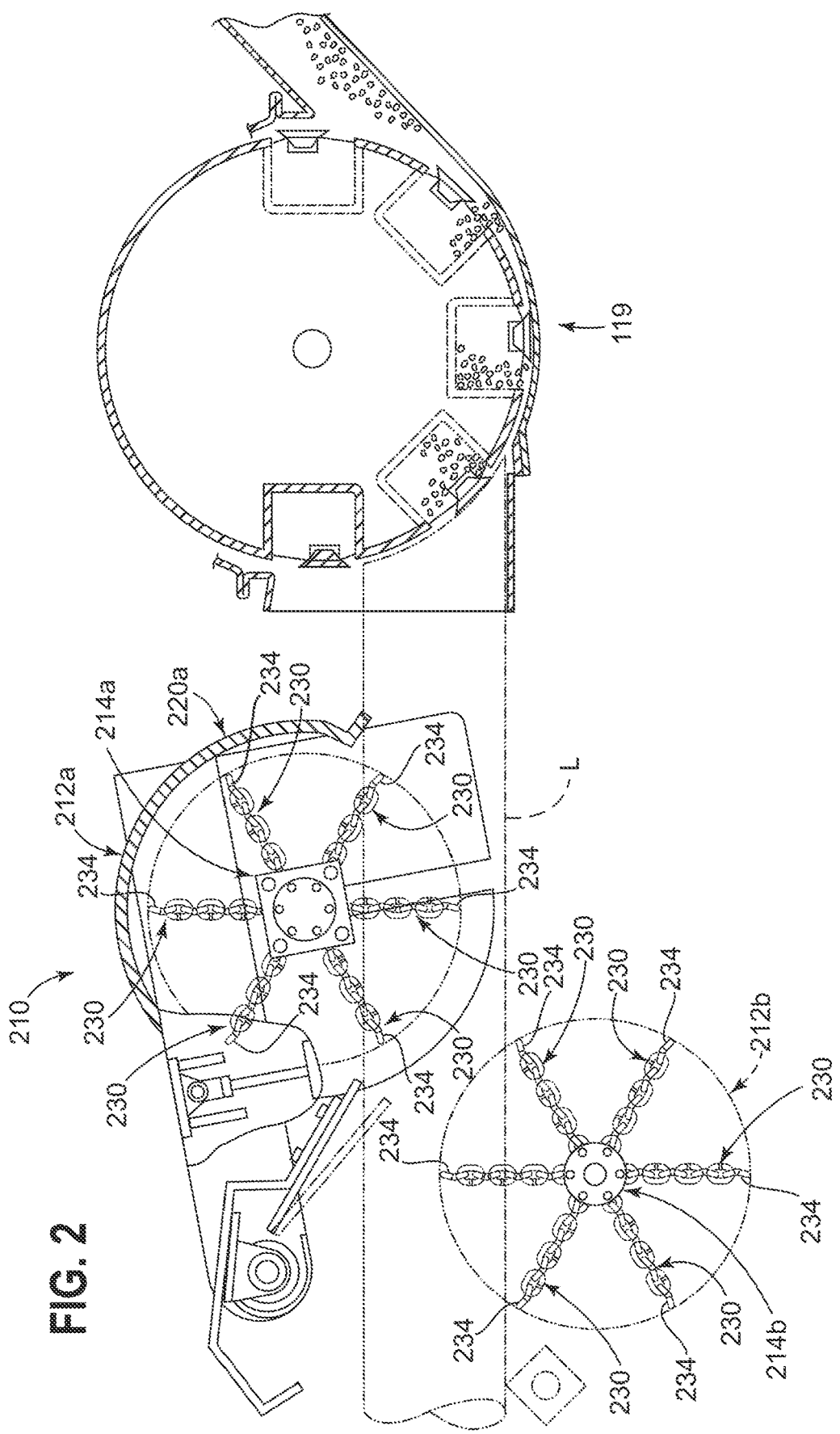
FIG. 2 is a partial cross-sectional side elevation view providing a schematic illustration of a debarking/delimbing/chipping apparatus 210 of the present invention utilizing debarking chains 230 having bent links 240, 240' (see also FIG. 3)
Figure 3:
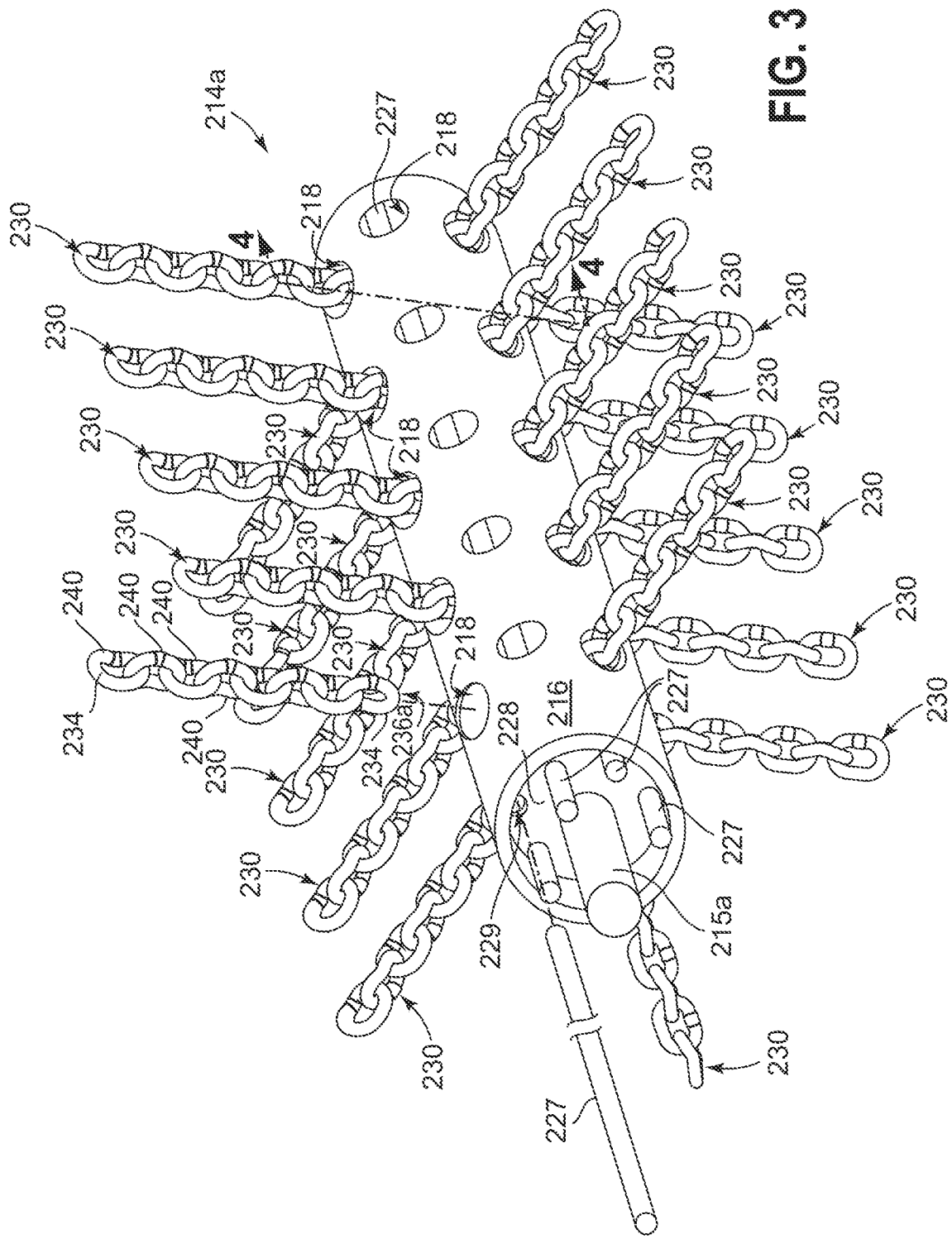
Figure 4:
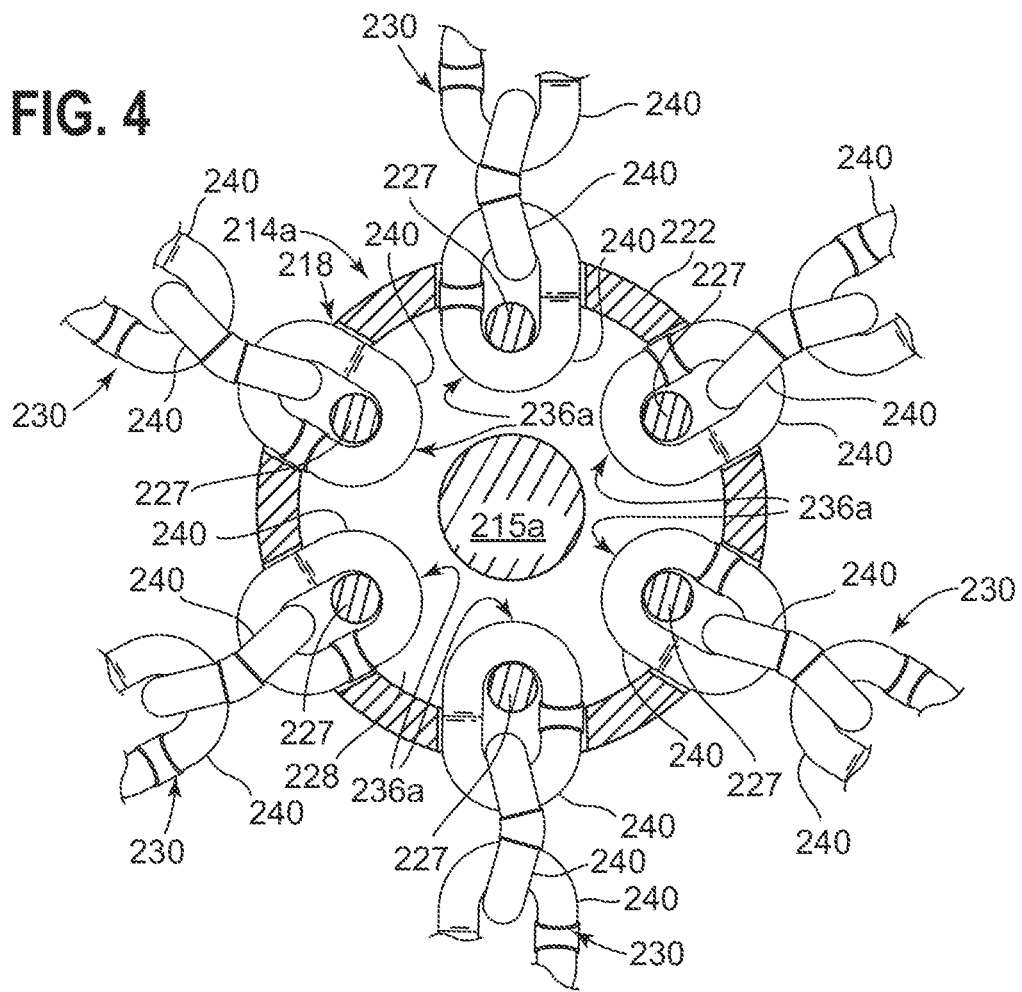
FIG. 4 is a partial cross-sectional view of the debarking drum 214a illustrated in FIG. 3, as seen from the line 4-4 of FIG. 3.

Referring now also to FIGS. 2-4, the securing rods 227 are generally secured within respective hubs 228 by threaded fasteners (not shown) secured to reciprocally thread fastener ends on the debarking drum (not shown).

It will be appreciated that the debarking drums 14a, 14b rotate at a very high rate of speed and that the debarking chains 30 strike the logs L with great force as the logs L enter the debarking/delimbing apparatus 10. A great deal of this force is generally directed to points along the outer surface of each of the respective chain links 32 as they strike adjacent and next to adjacent links and also on the inner surfaces where the adjacent links pull during the striking activity and strike one another as they recoil from striking the logs. It is commonly observed by persons familiar with debarking/delimbing operations that this is especially the case for the link that is the second from the end closest to the log of any secured debarking chain and also for the link that is third from the end. Indeed, wear to the point of breakage is most often observed in the prior art debarking chains at the second or third link from the end farthest from the drum and closest to the log. The reason for these second and third links of the prior art debarking chains being most prone to wear and breakage is generally believed to be as follows. First, the end link closest to the log is free to rotate about its inner perimeter with the adjacent second link. Therefore, impact on the inner and outer circumferential surfaces of the end link is distributed, whereas the contact point on the second link associated with impact from the end link is largely confined to the U-shaped radius of the end of the second link closest to the end link. Second, the end link also strikes the outside surface of the U-shaped end of the third link, while the inner perimeter of the U-shaped end of the second link impacts the inner perimeter of the U-shaped end of the third link, thus creating wear in an area of the third link, confined in the prior art debarking chains, to the inner perimeter and outer surface of the U-shaped end closest to the log L. This is one of the main reasons that debarking chains are disconnected and then "flipped" end for end, before being reconnected and used again, because "flipping" the chain concentrates the wear on the links at the other end of the debarking chain and, thereby, extending the wear life for each of debarking chains used in this way.

Figure 5:
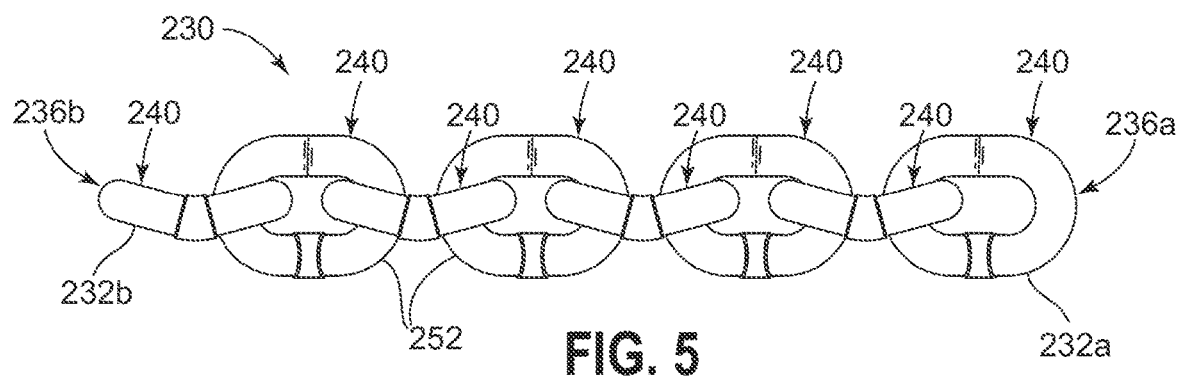
FIG. 5 is a side elevation view illustrating a preferred debarking chain 230 having eight bent in series, all of which are left bent links 240.
Figure 6:
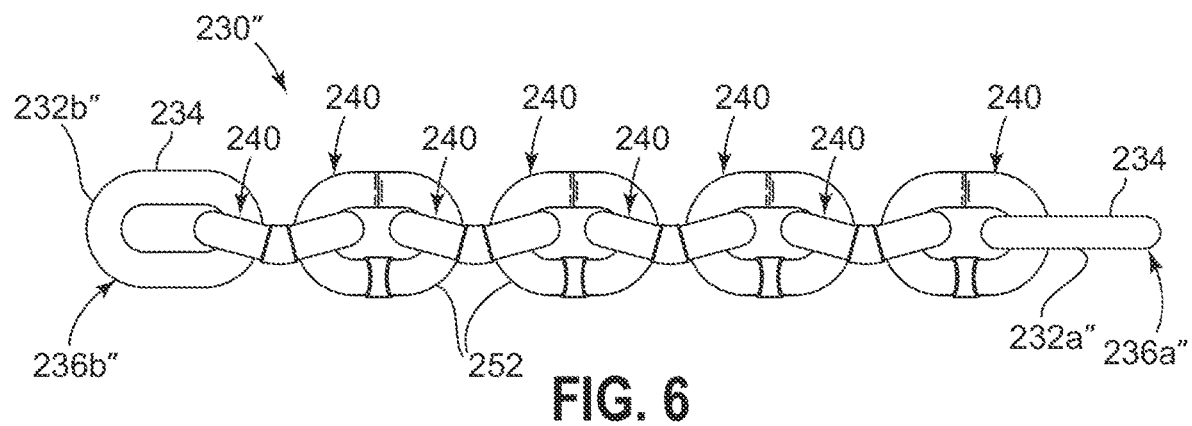
FIG. 6 is a side elevation view illustrating an alternate debarking chain 230'' of the present invention having ten links including two unbent oblong end links and eight intermediate bent links, all of which are left bent links 240.
Figure 7:
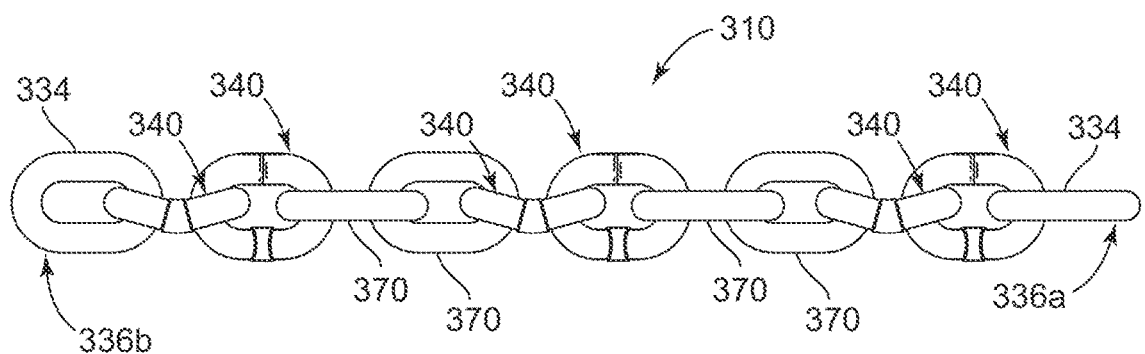
FIG. 7 is a side elevation view illustrating a further alternate debarking chain 310 of the present invention having twelve links, six of which are standard oblong links, two of which are end links 334 and the other four of which are intermediate links 370; while the remaining links are left bent links 340 connected in series of two and interspersed between the oblong links 334, 370, respectively.
Figure 8A:
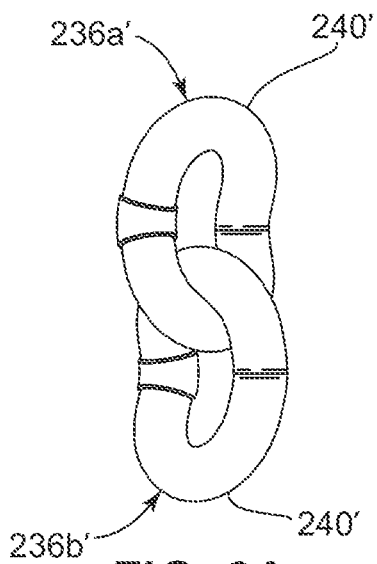
FIG. 8A is a side elevation view illustrating a coupling of two right bent links 240' shown in a vertical orientation.
Figure 8B:
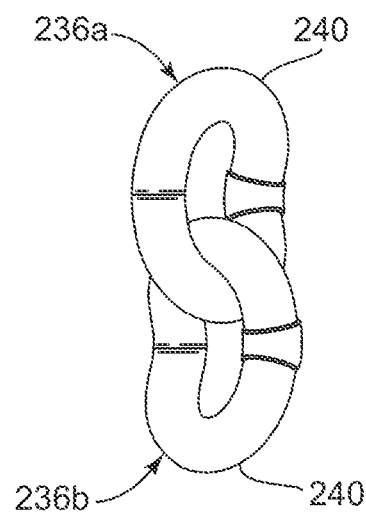
FIG. 8B is a side elevation view illustrating a coupling of two left bent links 240 shown in a vertical orientation.

Referring now also to FIGS. 5-7, it will be appreciated that the present inventors believe that oblong links 32, such as those included in the prior art debarking chains 30 shown in FIG. 1, do not break bark away from logs as effectively as preferred debarking chains 230, 230', 230", 230'", 310, 430 and 530 of the present invention, each of which includes bent links 240, 240', 340, 440, 440', 540, 540'. The bent links in the various embodiments of the present debarking chains can include left bent links 240, 340, 440, 540, right bent links 240', 440', 540', or both in every possible combination, including links that are not bent or are otherwise configured. The bent links can include left bent links 240, 340, 440, 540 in series, right bent links 240', 440', 540' in series, series of both right and left bent links mixing the two different links idiosyncratically and series of bent links that alternate between right and left bent links.

Debarking chains for the present invention include chains having a plurality of interconnected chain links, each chain link being a continuous strand of chain material surrounding and defining a central opening through which the continuous strands of any adjacent interconnected chain links pass. The plurality of interconnected chain links preferably include at least two bent links, preferably at least two adjacent bent links. In preferred embodiments the debarking chain is configured for attachment to a debarking drum of a flail-type debarking machine; the debarking chain including a plurality of interconnected chain links including two end links and a plurality of intermediate links that interconnect with each other and the respective end links in series so that each of the end links are interconnected only with a single intermediate link; the debarking chain having first and second ends; each chain link being a continuous strand of chain material surrounding and defining a central opening through which the continuous strand of chain material of any adjacent, interconnected chain link passes; the plurality of interconnected chain links including at least two bent links; wherein each of the bent links have first and second opposing end sections spaced apart from one another by first and second side sections of the continuous strand of chain material; wherein each of the first and second opposing end sections reside generally within a plane; the first end section residing generally within a first plane and the second end section residing generally within a section plane; wherein each of the respective bent links is bent proximate both of the respective side sections such that the second plane is deflected from the common plane at an angle of from about 5 to about 90 degrees, with the included angle being about 175 to about 90 degrees or 180 degrees minus the bend angle or the deflection angle.

In preferred embodiments, the bent links are selected from the group consisting of generally oblong links, generally square links and generally round links. In alternate embodiments, the bent links are selected from the group consisting of passing links and non-passing links. The debarking chain will preferably include at least two bent links interconnected in series with one another; preferably from about 3 to about 12, more preferably from about 4 to about 10. The bent links will preferably include links selected from the group consisting of right bent links and left bent links, wherein the first side section of each of bent link includes a weld portion positioned between first and second opposing end sections, wherein the weld portion is positioned to the right of the first end section and to the left of the second end section when the first side section is in a generally horizontal orientation and the first end section is position closest to a first end of the chain and the second end section is position closest to a second end of the chain; wherein both of the respective opposing end sections of a right bent link extend away from the weld portion to the right of the weld portion when the first side section and the second side section are oriented in a generally vertical orientation and the first end section and the first end are positioned above the weld portion and the second end section and the second end are position below the weld portion; and wherein both of the respective opposing end sections of a left bent link extend away from the weld portion to the left of the weld portion when the first side section and the second side section are oriented in a generally vertical orientation and the first end section and the first end are positioned above the weld portion and the second end section and the second end are position below the weld portion.

The debarking chain 230 illustrated in FIG. 5 has a series of 8 left bent links 240 when consider in the context of the entire chain 230 from the first link at the first end 236a to the last link at the second end 236b. The bend in the individual bent links causes debarking chains having bent links to strike the surfaces of logs is such a way that protruding edges 252, 252', 452, 552 at a sharp angle to the surface of the log. When bent links strike the logs at sharp angles to the surface of the log, it is believed that these protruding edges 252, 252', 452, 552 strike the surfaces of the logs much more aggressively, separating the bark in an explosive manner so as to give better results than are common anticipated for standard link chains that tend to flatten out when the standard links strike the logs.

Figure 5A:
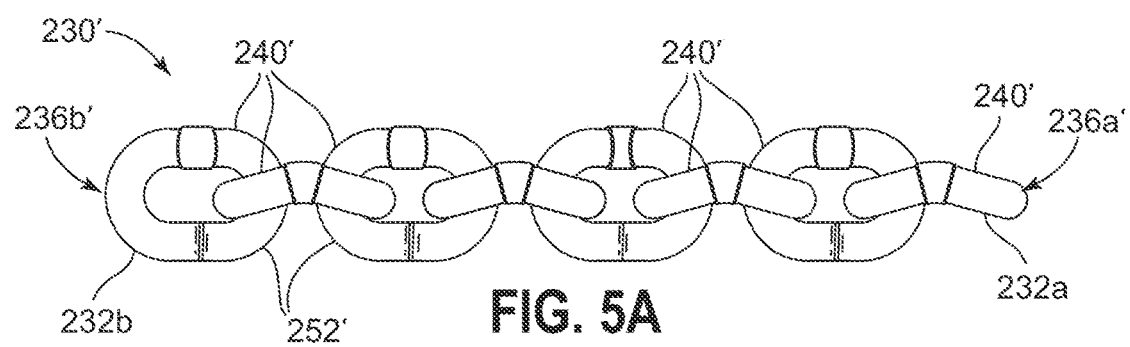
FIG. 5A is a side elevation view illustrating an alternate debarking chain 230' of the present invention having eight links, all of which are right bent links 240'.

The debarking chain 230' illustrated in FIG. 5A has a series of 8 right bent links 240' when considered in the context of the entire chain 230' from the first link at the first end 236a' to the last link at the second end 236b'.

Figure 5B:
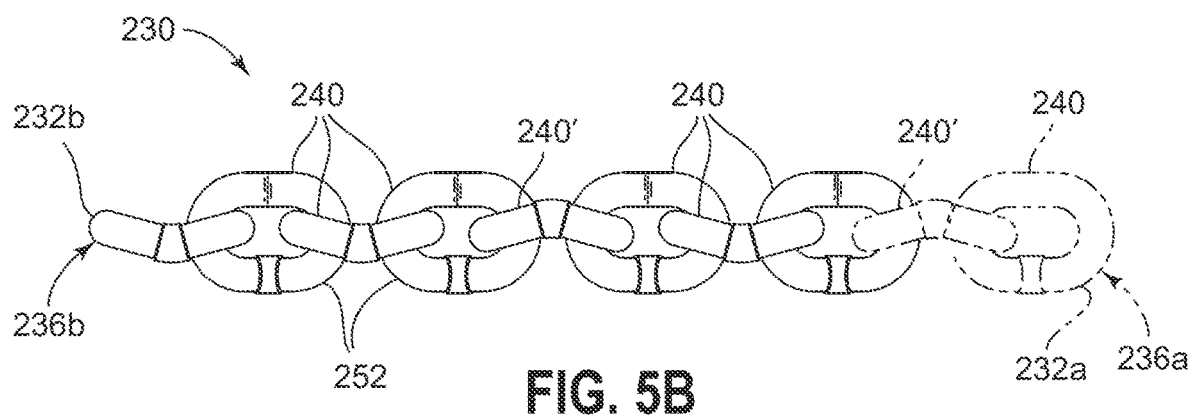
FIG. 5B is a side elevation view illustrating the debarking chain 230''' is similar to that shown in FIG. 5, but one that has a right bent link 240' at link number 5 from the left and to which two additional bent links have been added in phantom to the first end 236a, a left bent link 240 and a right bent link 240' so that the chain, including the links shown in phantom, has ten bent links in series.

The debarking chain 230''' illustrated in FIG. 5B has a series of 8 bent links 240, 240' with another two shown in phantom. All of the bent links in the chain 230''' are left bent links when considered in the context of the entire chain 230''' from the first link 232a shown in phantom at the first end 236a to the last link at the second end 236b, except for the second link 240', shown in phantom, and the sixth link 240', both of which are right bent links 240' in the context of the chain 230''. It will be appreciated that all of the links can be interchanged within the scope of the present invention and that a debarking chain of the present invention can have any practical number of links, preferably from about 4 to about 14 links, more preferably from about 6 to about 12 links, more preferably from 8 to 10 links. Furthermore, the links can be connected to one another in any order, whether bent links and unbent links, whether standard oblong links, bent or not, round passing links, bent or not, or square passing links, bent or not.

Figure 5C:
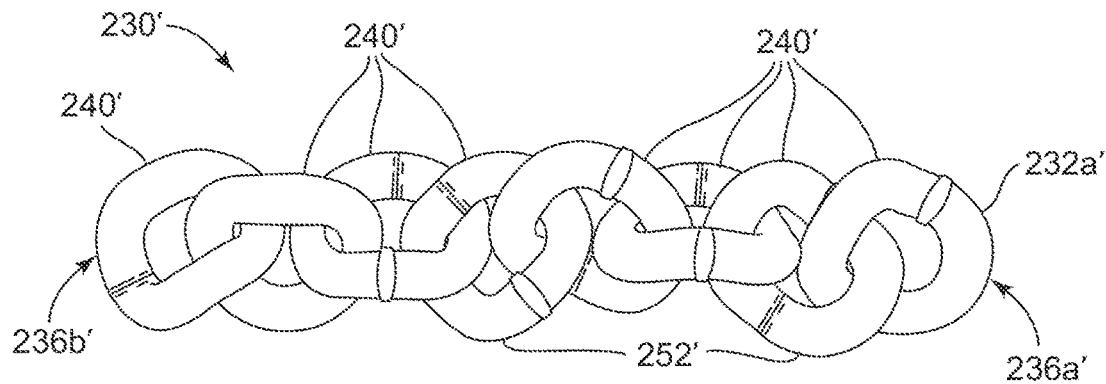
FIG. 5C is a side elevation view illustrating a somewhat used debarking chain 230' of the present invention having eight links, all of which are right bent links 240'.

The debarking chain 230' of the present invention shown in FIG. 5C is an eight link chain similar to that shown in FIG. 5A, wherein all of links are right bent oblong links 240' having a plurality of protruding edges 252' that are believe to enhance the ability of the debarking chain 230' to effectively debark logs.

The alternate debarking chain 230'' illustrated in FIG. 6 has ten links including two unbent oblong end links 234 at both the first end 236a'' and the second end 236b'', with eight intermediate bent links, all of which are left bent links 240, in series in between.

The alternate debarking chain 310, shown in FIG. 7, has twelve links, six of which are standard oblong links, the two end links 334 at both ends 336a, 336b of the chain 310, and four of which are intermediate, unbent, standard oblong links 370. The remaining links are left bent links 340 connected in three separate series of two and interspersed between the oblong links 334, 370, respectively.

It is believed that the protruding edges 252, 252', 452, 552 of the bent links in the various debarking chains of the present invention are presented in an aggressive striking position when the debarking chains are whipped around debarking drums to which they are attached at speeds of from about 300 to about 600 rpm or more, perhaps as much as 750 rpm or more as they strike the surface of the logs. In contrast, it is believed that the prior art debarking chain 30, as illustrated in FIG. 1, will generally strike logs with a flat side 33 of respective oblong links 32 that contact the log L as the debarking drums 14a, 14b rotate. Such sides 33 are flat and smooth and are believed to generally lack protruding edges that might more effectively engage and debark the logs L. It is an object of the present invention to maximize the bark removal effectiveness of the debarking chain by creating debarking chains having a substantial number of protruding edges that will aggressively break and chip away at the bark of the surfaces of logs L.

It is believed to be in the nature of the bent link debarking chains of the present invention that it will not lay flat when it strikes the log L. This makes the present chain much more effective than prior art debarking chains that are believed to be able to lie generally flat when used in debarking operations to strike logs. Instead, it is believed that the preferred debarking chain 130 will present multiple outer faces that can strike the log L, each of which will have greater differentiation between high points and low points associated with the respective outer face when the preferred chain strikes the log L. It is believed that the preferred debarking chain 230, 230', 230'', 230''', 310, 430, 530 and other debarking chains contemplated by the present inventors will be more cost effective than prior art debarking chains and even allow operators to use the preferred bent link debarking chain at lower speeds that minimize fuel consumption and wear and tear on the debarking apparatus and the debarking chains themselves, thereby increasing return on investment and minimize costs for 1) fuel use, 2) machine and machine part replacement, and 3) chain replacement.

As defined herein, a bent link, will either be a left bent link 240, 340, 440, 540 or a right bent link 240', 340', 440', 540', whether the bent link is an end link or an intermediate link or whether it is a standard oblong link 270, a round passing link 470 or a square passing link 570, which is preferably bent in a forming process in which the link 270, 470, 570 is formed in a convention wire form welding process and then positioned on a V-block (not shown) and pressed with a moveable anvil (not shown) to bend the link to a desired angle.

Figure 9A:
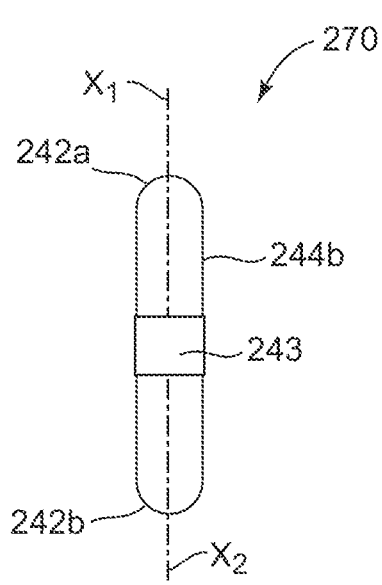
FIG. 9A is a side elevation of a single standard oblong link 232 shown in a vertical orientation; the link have a first central axis line X1 passing through the upper or first end section 242a and a second central axis line X2 passing through the lower or second end section 242a of the link 232, each of which passes through the chain material at its greatest thickness.
Figure 9B:
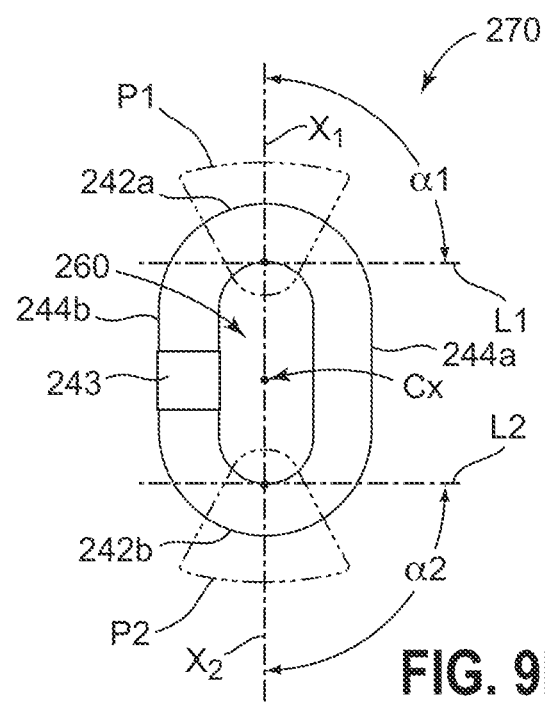
FIG. 9B is a top plan view of the vertically oriented oblong link 232 shown as shown in FIG. 9A, but showing the link turned 90 degrees into the page so as to show schematic representations in dashed line of the first central axis line X1 separated from the second central axis line X2 by a center point Cx, where each of the two central axis lines X1, X2 end; and showing a first plane P1 within which central axis line X1 resides along with intersecting line L1, which intersects with and is perpendicular to the link 232 and the central axis line X1 and passes through the link 232 at a plurality of points (not shown) that are consistent with the center of the greatest diameters of the chain material making up the chain link; and showing a second plane P2 within which central axis line X2 resides along with intersecting line L2, which intersects with and is perpendicular to the link 232 and the central axis line X2 and passes through the link 232 at a plurality of points (not shown) that are consistent with the center of the greatest diameters of the chain material making up the chain link.
Figure 10A:
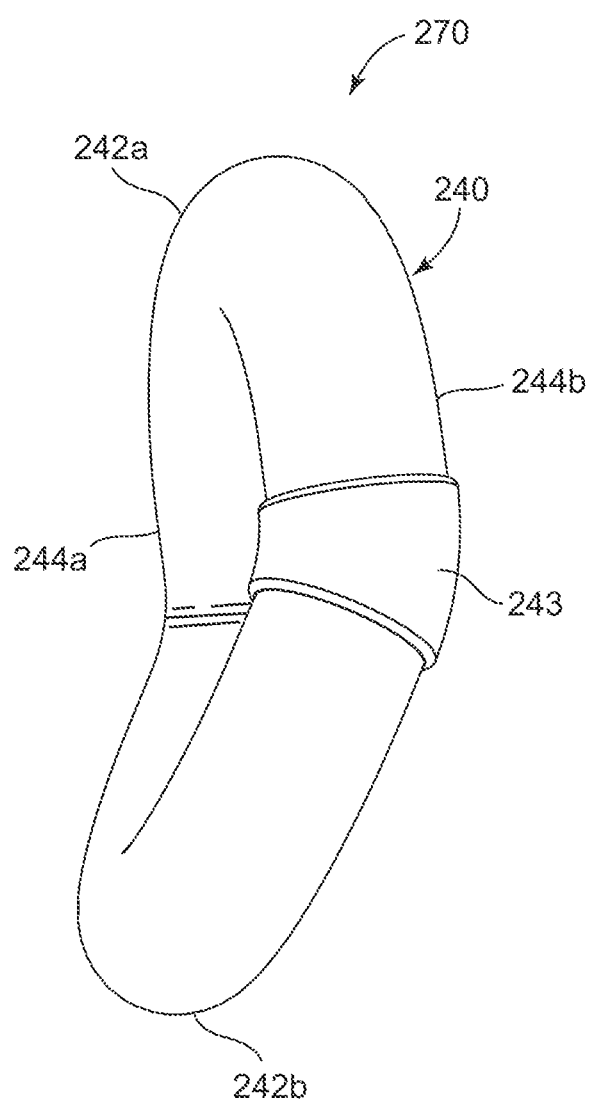
FIG. 10A is a perspective view of a standard oblong link that is bent so that it appears to be a left bent link 240 in it present orientation, assuming it remains in the orientation in which it is shown and is interconnected with other links in the context of a debarking chain, but also noting that if the link was flipped end for end and then placed within the context of a different chain, this same link could be a right bent link 240'.
Figure 10B:
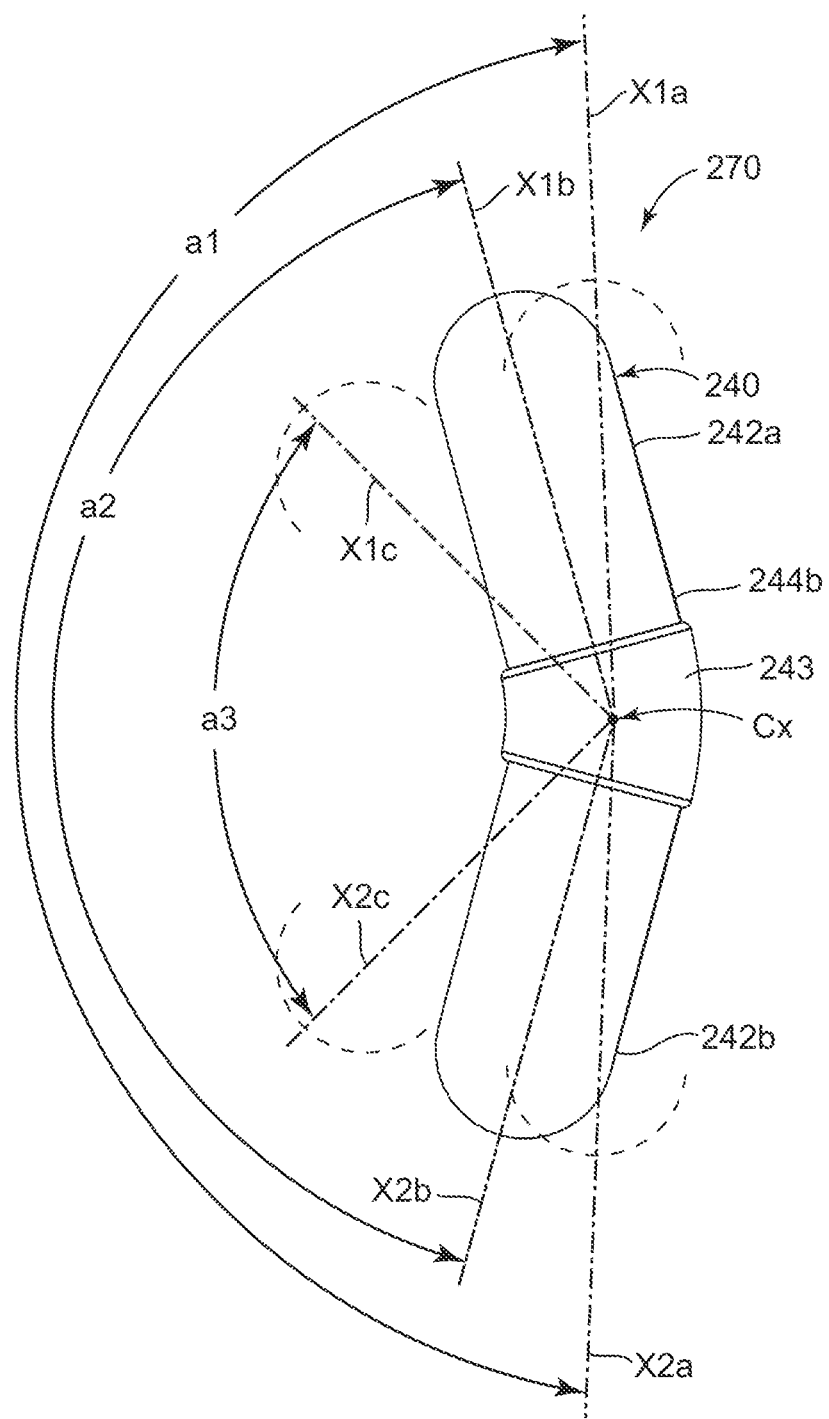
FIG. 10B is a side elevation view of an oblong bent link like the link shown in FIG. 10A, which is oriented so that it appears to be a left bent 240 to the degree to which it remains in the orientation in which it is shown and is interconnected with other links in the context of a debarking chain, but also noting that if the link was flipped end for end and then placed within the context of a different chain, this same link could be a right bent link 240'; but noting nevertheless a range of degrees for the included angle to which the oblong link is preferably bent, whether to the left or the right.
Figure 11:
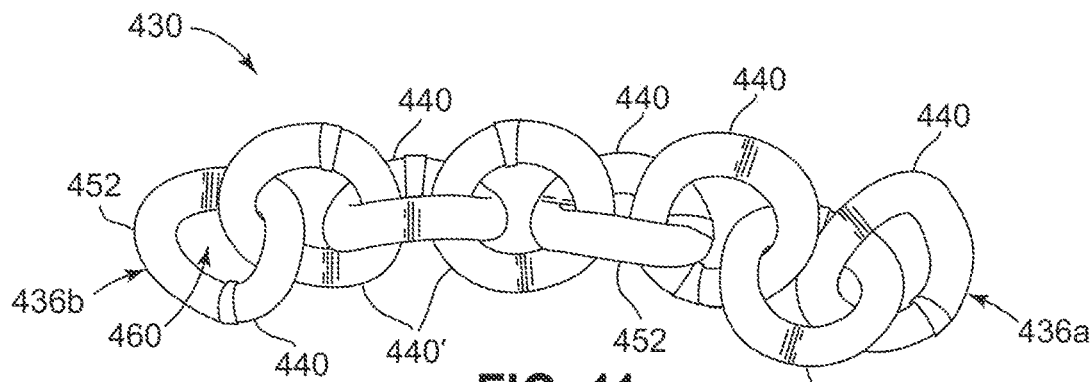
FIG. 11 is a side elevation view illustrating a debarking chain 430 of the present invention having eight round links, some of which are left bent links 440 and some of which are right bent links 240; each of the round links are also passing links.
Figure 11A:
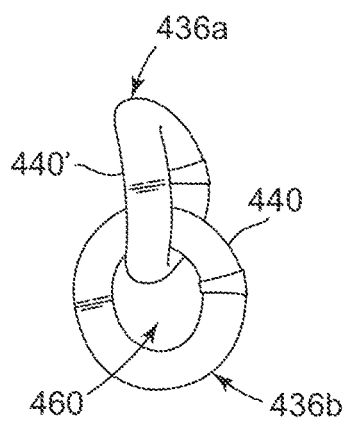
FIG. 11A is a side elevation view of a two link chain made of two round passing link 440, 440' that are both bent links, one of which is a left bent link 440 and one of which is a right bent link 440'.
Figure 11B:
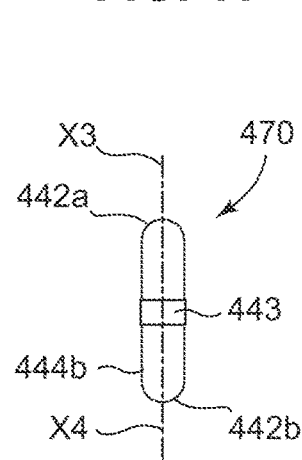
FIG. 11B is a side elevation view of a round link 470.
Figure 11C:
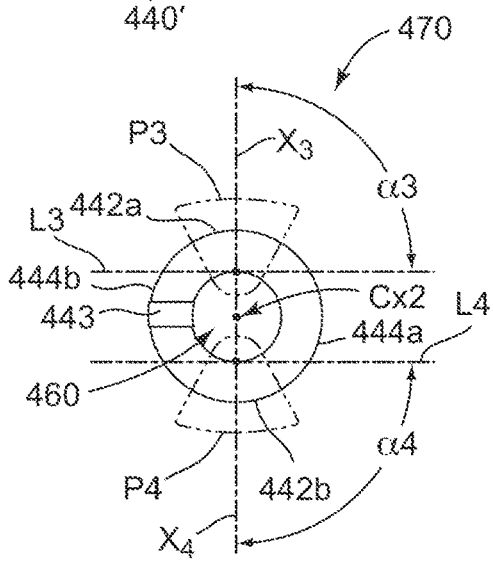
FIG. 11C is a top plan view of the round link 470 shown in FIG. 11B.
Figure 12A:
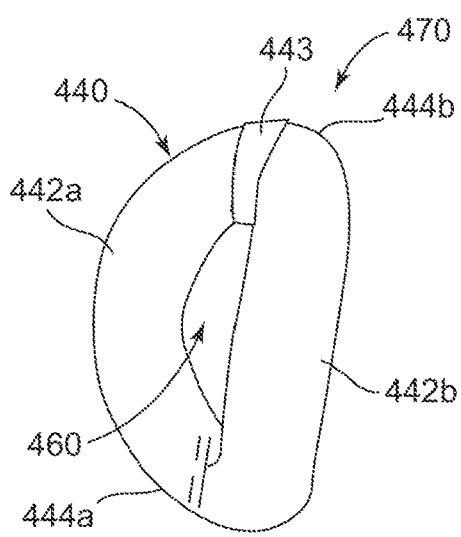
FIG. 12A is perspective view of a round passing link that is bent so that it appears to be a left bent link 440 in it present orientation, assuming it remains in the orientation in which it is shown and is interconnected with other links in the context of a debarking chain, but also noting that if the link was flipped end for end and then placed within the context of a different chain, this same link could be a right bent link 440'.
Figure 12B:
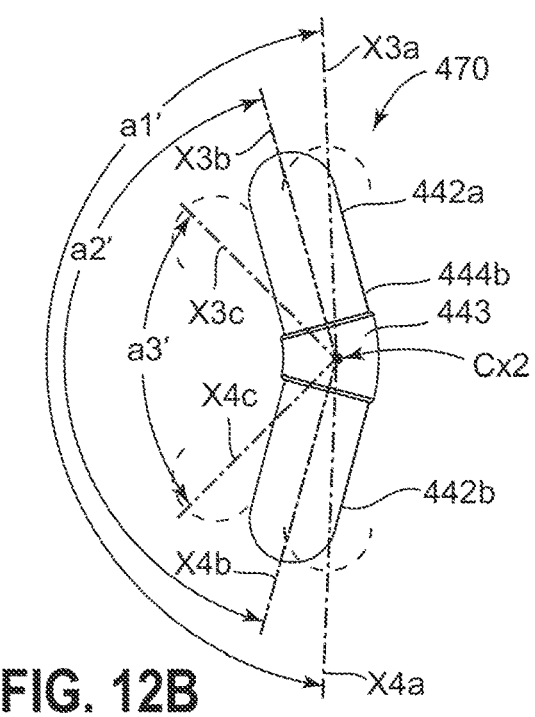
FIG. 12B is a side elevation view of a round bent link like the link shown in FIG. 12A, which is oriented so that it appears to be a left bent link 440 to the degree to which it remains in the orientation in which it is shown and is interconnected with other links in the context of a debarking chain, but also noting that if the link was flipped end for end and then placed within the context of a different chain, this same link could be a right bent link 440'; but noting nevertheless a range of degrees for the included angle to which the round link 470 is preferably bent, whether to the left or the right.
Figure 13:
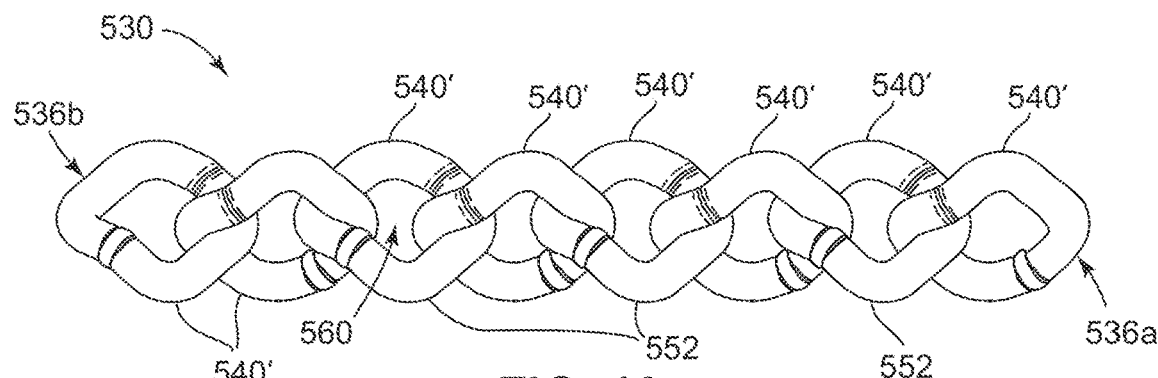
FIG. 13 is a side elevation view illustrating a debarking chain 530 of the present invention having eight square links, all of which are right bent links 540'; each of the square links 540' are also passing links.
Figure 13A:
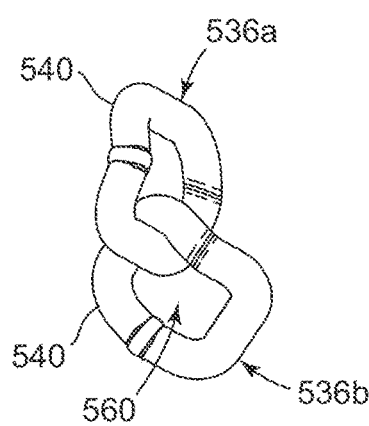
FIG. 13A is a side elevation view of a two link chain made of two square passing link 540 that are both left bent links in the orientation that is shown.
Figures 13B, 13C:
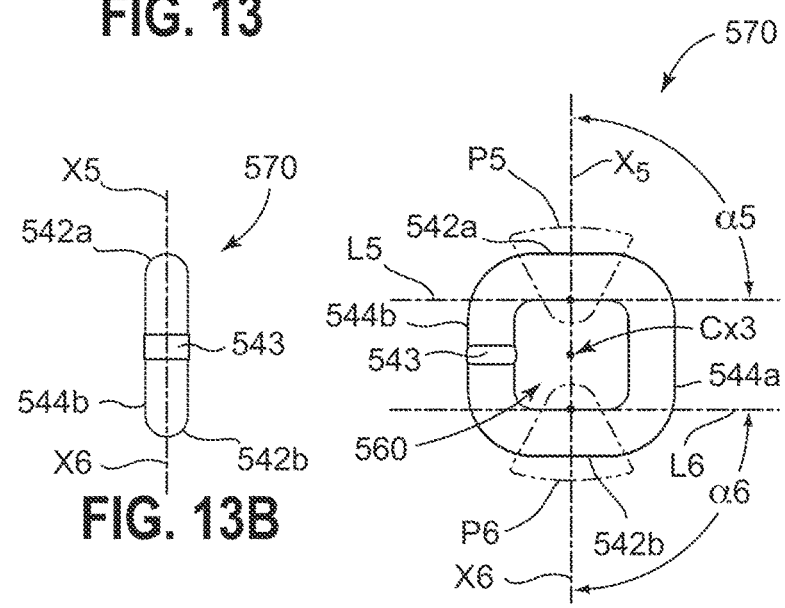
FIG. 13B is a side elevation view of a square link 570.
FIG. 13C is a top plan view of the square link 570 shown in FIG. 13B.

Referring now also to FIGS. 8A-14B, bent links are generally chain links that are made from blanks of either standard oblong links 270, generally round passing links 470, or generally square passing links 570 shown in FIGS. 9A-9B, 11B-11C, and 13B-13O, respectively, that have first and second opposing end sections 242a, 242b; 442a, 442b; 542a, 542b, respectively, that are spaced apart from one another by right and left, or first and second, opposing side sections 244a, 244b; 444a, 444b; 544a, 544b; respectively. The oblong link blank 270 is generally configured so that the first and second opposing end sections 242a and 242b and the first and second opposing side sections 244a and 244b of the blank illustrated in FIGS. 9A and 9B are coplanar, with the link 270 generally lying in a single common plane. Similarly, the first and second opposing end sections 442a and 442b and the first and second opposing side sections 444a and 444b of the round link blank 470 illustrated in FIGS. 11B and 110 are coplanar, with the link 470 generally lying in a single common plane. Similarly, the first and second opposing end sections 542a and 542b and the first and second opposing side sections 544a and 544b of the square link blank 570 illustrated in FIGS. 13B and 13C are coplanar, with the link 570 generally lying in a single common plane. Therefore, in the oblong link blank 270 of FIGS. 9A and 9B, planes P1 and P2 are in the same plane. Similarly, in the round link blank 470 of FIGS. 11B and 11C, planes P3 and P4 are in the same plane, and in the square link blank 570 of FIGS. 13B and 13C, planes P5 and P6 are in the same plane.

When the bent links are formed from the blanks 270 of FIGS. 9A and 9B, plane P1 is deflected with respect to plane P2, by a bend angle or deflection angle (not shown), which is preferably between about 5 degrees to about 90 degrees. The included angle between the first and second opposing end sections 242a and 242b is illustrated on FIG. 10B, labeled a1, a2, a3. Angles a1, a2, a3 are examples of the included angle, which are preferably between about 175 degrees and 90 degrees, with angle a1 being about 175 degrees, angle a2 being about 150 degrees, and angle a3 being about 90 degrees. Similarly, when the bent links are formed from the blanks 470 of FIGS. 11B and 110, or blanks 570 of FIGS. 13B and 13C, angles a1', a2', a3'; and a1'', a2'', a3''; respectively, are examples of the included angle, and are preferably between about 175 and 90 degrees, with angles a1' and a1'' being about 175 degrees, angles a2' and a2'' being about 150 degrees, and angles a3' and a3'' being about 90 degrees.

It will be appreciated that the bend angle or deflection angle and the included angle are supplementary to one another, summing to 180 degrees. Therefore, if any of planes P1 and P2, P3 and P4, P5 and P6, respectively, of the blanks 270, 470, and 570, are deflected from a common plane when the blanks 270, 470, and 570, are bent, the bend angle or deflection angle will be the degrees to which the respective planes are deflected from a coplanar orientation. Thus, if planes P1 and P2, P3 and P4, P5 and P6, stand at an included angle of 175 degrees, the deflection angle will be 5 degrees, which is 180 degrees minus the included angle. Similarly, if planes P1 and P2, P3 and P4, P5 and P6, stand at an included angle of 150 degrees, the deflection angle will be 30 degrees, which is 180 degrees minus the included angle. Similarly, if planes P1 and P2, P3 and P4, P5 and P6, stand at an included angle of 90 degrees, the deflection angle will be 90 degrees, which is 180 degrees minus the included angle.

Figure 14A:
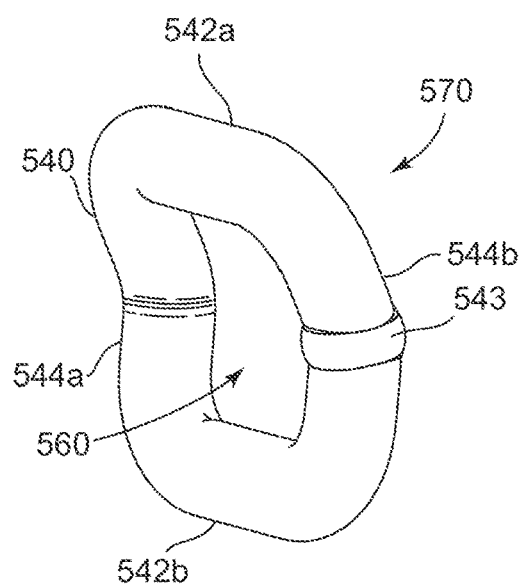
FIG. 14A is perspective view of a square passing link that is bent so that it appears to be a left bent link 540 in it present orientation, assuming it remains in the orientation in which it is shown and is interconnected with other links in the context of a debarking chain, but also noting that if the link was flipped end for end and then placed within the context of a different chain, this same link could be a right bent link 540'.
Figure 14B:
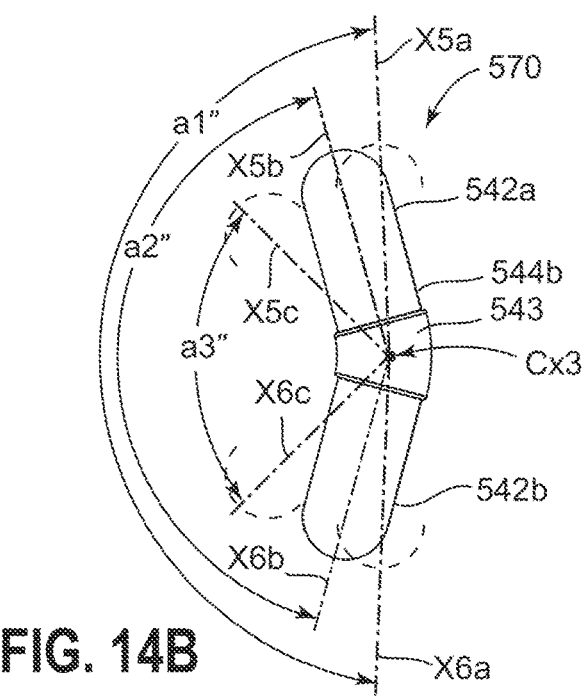
FIG. 14B is a side elevation view of a square bent link like the link shown in FIG. 14A, which is oriented so that it appears to be a left bent link 440 to the degree to which it remains in the orientation in which it is shown and is interconnected with other links in the context of a debarking chain, but also noting that if the link was flipped end for end and then placed within the context of a different chain, this same link could be a right bent link 440'; but noting nevertheless a range of degrees for the included angle to which the square link 570 is preferably bent, whether to the left or the right.

When the bent links are formed from each of these blanks, the blanks are finished welded links that are part of a chain and the blank links are then bent preferably generally proximate both opposing side sections, preferably generally perpendicular to axis lines X1-X2, X3-X4 and X5-X6, respectively. The force placed on the respective blank, proximate the respective opposing side section 244 is preferably perpendicular to the axis line or lines X1-X2, X3-X4, X5-X6, respectively, passing through the respective links 270, 470, 570 from end to end, such that the deflection angle between opposing planes P1, P2; P3, P4; and P5, P6, respectively, in which the respective opposing end sections 242a, 242b; 442a, 442b; 542a, 542b, respectively, reside, will be generally repeatable as a series of links are bent by the moveable anvil pressing against the link as the link sits on the V-block. In preferred embodiments the bend angle will preferably be from about 5 degrees to about 90 degrees, preferably, from about 10 degrees to about 70 degrees, more preferably from about 20 degrees to about 50 degrees. In certain preferred embodiment the bend angle will be about 30 degrees. In FIGS. 10B, 12B and 14B, the angles between the respective planes P1, P2; P3, P4; and P5, P6, respectively, and the axis lines X1-X2, X3-X4, X5-X6, respectively, that reside within the respective planes are a1, a1' and a1''; a2, a2' and a2''; and a3, a3' and a3''. The angles are measured as degrees that the bend between the respective planes and/or axis line are removed from being in a common plane, so that the bend of angles a1, a1' and a1'' are about 5 degrees; the bend of angles a2, a2' and a2'' are about 30 degrees; and the bend of angles a3, a3' and a3'' are about 90 degrees or less than an orientation in which the planes and axis lines were lying is a common plane as would be the case with the respective blank links 270, 470 and 570, shown in FIGS. 9B, 11C, and 13C when the respective axis lines X1 and X2, X3 and X4, and X5 and X6, divided by center points Cx1, Cx2 and Cx3, respectively, and are, in effect, a single axis line because there is no bend in the respective blank links.

The second or left side section 244b, 444b, 544b will generally include a weld section or weld portion 243, 443, 543. For the purpose of describing the orientation of the bend in bent links 240, 240', 340, 440, 440', 540, 540' the bent links will be discussed as they are positioned in a series of interconnected chain links in a flail-type debarking chain of the present invention, as previously discussed.

FIG. 3 further illustrates aspects of the debarking drum 214a of the present invention. The debarking drum 214a has an outer surface or cylindrical plate 216, 222 having a plurality of chain securing openings or pockets 218 in which an end link 234 of a debarking chain 230 can be secured. The debarking drum assembly 214a is configured to allow the end links 234 of the debarking chains 230 to fit into the pockets 218, along an axis perpendicular to the length of the debarking drum assembly 214a. The end link 234 of each debarking chain 230 that resides within the pocket 218 is secured by a securing rod 227 that is preferably configured to slide through securing openings 229 in hubs 228 at each of two ends of the cylindrical plate 216,222 or perhaps at a single end in other embodiments, such that it can reside within the cylindrical plate 216, 222 of the debarking drum 214a along an axis parallel to that of the debarking drum 214a and inserted such that it passes through each end link 234 of each of the attached debarking chains 230. Each debarking chain 230 in the debarking drum assembly 214a is preferably constructed to rotate about the shaft or axis 215a, 215b at a high rate of speed of from about 250 to about 550 rpm or even more, up to as much as about 750 rpm or even more.

A cut away view from the illustration shown in FIG. 3 is shown in FIG. 4 showing part of the debarking drum 114a in greater detail. The end link 240 at the first end 236a of each debarking chain 230 that passes through the openings or pockets 218 is preferably fastened to a rod 227 secured between two hubs 228 9 only one shown in FIG. 4 only) at each end of the drum assembly 214a.

As illustrated in FIGS. 2-4, a preferred debarking chain 230 is disclosed that is configured for attachment to a debarking drum 214a, 214b. The chain 230 will preferably include a plurality of interconnected chain links including two end links 234 and a plurality of intermediate bent links 240, 240' that interconnect with each other and the respective end links 234 in series so that each of the end links 234 are interconnected only with a single intermediate link 240, 240'. It will be understood that in alternate embodiments of the flail type debarking chain of the present invention some or all of the intermediate links and the end links may or may not be bent links, as described herein. The preferred debarking chain 230 has first and second ends 232a, 232b.

Preferred debarking chains 230, 230', 230", 230''', 310, 430, 530 of the present invention are preferably configured for attachment to a debarking drum The flail type debarking chains 230, 230', 230", 230''', 310, 430, 530 include a plurality of interconnected chain links including two end links and a plurality of intermediate links as previously described.

In alternate embodiments, the debarking chains of the present invention can have as many as five, six, seven, eight, nine, ten, eleven, twelve, thirteen, fourteen or fifteen links. As will become apparent to those skilled in the art, there are numerous variations in the configuration of the debarking chains containing at least two interconnected bent links, which are within the spirit and scope of the present invention. The length of the chains, number and location of passing links and oblong links are by no means limited to the specific configurations described herein. Additionally, different arrangements and organization of the various components are also possible.

One embodiment of the present invention includes bent links 230, 230', 230", 230''', 310, 430, 530 constructed of through hardened steel for increased wear life. In other embodiments, all of the links will be through hardened, although other known methods of hardening the steel links can also be employed.

As set forth in Table I, below, various standard chains were used to make chains have a continuous series of bent links. The chains that we used included: 0.656 Oblong Debarking Chain with 8 links; 0.656 Oblong Debarking Chain with 9 links; 0.656 Round Debarking Chain with 8 links; 0.656 Round Debarking Chain with 9 links; 21/32 Tuna Chain with 8 links; 5/8 S7 Tuna Chain with 8 links; 5/8 Scallop Chain with 8 links; 16 mm LL Trawl Chain with 4 links; 16 mm 90 Trawl Chain with 5 links; and 5/8 AFK Barn Chain with 5 links. The respective chains were measured for 1) inside length of the links, 2) outside width of the links, 3) inside length of the links and 4) working length of the chain before bending each of the links and 1) the inside length of each link and 2) the working length of the chain after each of the links were bent to the bend angle that was recorded for 10 chains in order to gauge how the bend to the links will change the length of the respective chains. The average of these measurements is reported in Table I below.

Table I:

TABLE I

Link Bending
Wire Diameter 0.656
Bend Radius 0.656

| | | Dimensions in Inches | | | | | | |
| --- | --- | --- | --- | --- | --- | --- | --- | --- |
| | | Pre Bend | | | | Post Bend | | |
| Chain | Number of Links | Inside Width of Link | Outside Width of Link | Inside Length of Link | Working Length of Chain | Bend Angle (Degrees) | Inside Length of Link | Working Length of Chain |
| 0.656 Oblong Debarking Chain | 8 | 0.9650 | 2.2770 | 1.8050 | 15.0960 | 30.00 | 1.7328 | 14.5187 |
| 0.656 Oblong Debarking Chain | 9 | 0.9650 | 2.2770 | 1.8050 | 16.9010 | 53.91 | 1.6044 | 15.0960 |
| 0.656 Round Debarking Chain | 8 | 1.7600 | 3.0720 | 1.7600 | 14.7360 | 30.00 | 1.6894 | 14.1709 |

TABLE I-continued

Link Bending
Wire Diameter 0.656
Bend Radius 0.656

| | | Dimensions in Inches | | | | | | |
|---|---|---|---|---|---|---|---|---|
| | | Pre Bend | | | | Post Bend | | |
| Chain | Number of Links | Inside Width of Link | Outside Width of Link | Inside Length of Link | Working Length of Chain | Bend Angle (Degrees) | Inside Length of Link | Working Length of Chain |
| 0.656 Round Debarking Chain | 9 | 1.7600 | 3.0720 | 1.7600 | 16.4960 | 46.93 | 1.6045 | 15.0966 |
| 21/32 Tuna | 8 | 1.0250 | 2.3370 | 1.8950 | 15.8160 | 33.10 | 1.8050 | 15.0960 |
| 5/8 S7 Tuna | 8 | 1.0250 | 2.3370 | 1.8950 | 15.8160 | 33.10 | 1.8050 | 15.0960 |
| 5/8 Scallop | 8 | 0.9285 | 2.2405 | 1.9470 | 16.2320 | 42.17 | 1.8050 | 15.0960 |
| 16 mm LL Trawl | 4 | 1.0300 | 2.3420 | 3.9400 | 16.4160 | 46.49 | 3.6100 | 15.0960 |
| 16 mm Trawl 90 | 5 | 1.0300 | 2.3420 | 3.9400 | 20.3560 | 90.24 | 2.8880 | 15.0960 |
| 5/8 AFK Barn | 5 | 0.9900 | 2.3020 | 3.5100 | 18.2060 | 70.85 | 2.8880 | 15.0960 |

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A debarking chain configured for attachment to a debarking drum of a flail-type debarking machine; the debarking chain comprising:
   a plurality of interconnected chain links including two end links and a plurality of intermediate links that interconnect with each other and the respective end links in series so that each of the end links are interconnected only with a single intermediate link; the debarking chain having first and second ends; each chain link being a continuous strand of chain material surrounding and defining a central opening through which the continuous strand of chain material of any adjacent, interconnected chain link passes;
   the plurality of interconnected chain links including at least two bent links; wherein each of the bent links have first and second opposing end sections spaced apart from one another by first and second side sections of the continuous strand of chain material; wherein each of the first and second opposing end sections reside generally within a plane; the first end section residing generally within a first plane and the second end section residing generally within a section plane; wherein each of the respective bent links is bent proximate both of the respective side sections such that the first plane resides at a bend angle with respect to the second plane of from about 5 to about 90 degrees.

2. The debarking chain of claim 1, wherein the bent links are selected from the group consisting of generally oblong links, generally square links and generally round links.

3. The debarking chain of claim 1, wherein the bent links are selected from the group consisting of passing links and non-passing links.

4. The debarking chain of claim 1, wherein the at least two bent links are interconnected in series with one another.

5. The debarking chain of claim 1, wherein the bent links include links selected from the group consisting of right bent links and left bent links, wherein the first side section of each of bent link includes a weld portion positioned between first and second opposing end sections, wherein the weld portion is positioned to the right of the first end section and to the left of the second end section when the first side section is in a generally horizontal orientation and the first end section is position closest to a first end of the chain and the second end section is position closest to a second end of the chain; wherein both of the respective opposing end sections of a right bent link extend away from the weld portion to the right of the weld portion when the first side section and the second side section are oriented in a generally vertical orientation and the first end section and the first end are positioned above the weld portion and the second end section and the second end are position below the weld portion; and wherein both of the respective opposing end sections of a left bent link extend away from the weld portion to the left of the weld portion when the first side section and the second side section are oriented in a generally vertical orientation and the first end section and the first end are positioned above the weld portion and the second end section and the second end are position below the weld portion.

6. The debarking chain of claim 5, wherein at least two of the bent links are right bent links.

7. The debarking chain of claim 5, wherein at least two of the bent links are left bent links.

8. The debarking chain of claim 5, wherein at least two of the bent links are interconnected with each other and at least one is a left bent link and at least one is a right bent link.

9. The debarking chain of claim 1, wherein the plurality of interconnected links are bent links; and wherein the first side section includes a weld and the bent links are selected from the group consisting of right bent links in which the opposing end sections are bent to the right of the weld and left bent links in which the opposing end sections are bent to the left of the weld.

10. A flail-type debarking chain configured for attachment to a debarking drum of a flail type debarking machine; the debarking chain comprising:
   a plurality of interconnected chain links including two end links and a plurality of intermediate links that interconnect with each other and the respective end links in series so that each of the end links are interconnected only with a single intermediate link and each intermediate link is interconnected with two interconnected links; the debarking chain having first and second ends; each chain link being a continuous strand of chain material surrounding and defining a central opening through which the continuous strand of chain material of any adjacent, interconnected chain link passes;

the plurality of intermediate links including at least two bent links; wherein each of the bent links have first and second opposing end sections spaced apart from one another by first and second side sections of the continuous strand of chain material; wherein each of the first and second opposing end sections reside generally within a plane; the first end section residing generally within a first plane and the second end section residing generally within a section plane; wherein each of the respective bent links is bent which is bent proximate each of the respective side sections such that the first plane resides at a bend angle with respect to the second plane of from about 5 to about 90 degrees.

11. The debarking chain of claim 10, wherein the bent links are selected from the group consisting of generally oblong links and generally round links.

12. The debarking chain of claim 10, wherein the bent links are selected from the group consisting of passing links and non-passing links.

13. The debarking chain of claim 10, wherein the at least two bent links are interconnected in series with one another.

14. The debarking chain of claim 10, wherein the first side section includes a weld and the bent links are selected from the group consisting of right bent links in which the opposing end sections are bent to the right of the weld and left bent links in which the opposing end sections are bent to the left of the weld.

15. The debarking chain of claim 14, wherein at least two of the bent links are right bent links.

16. The debarking chain of claim 15, wherein at least two of the bent links are left bent links.

17. The debarking chain of claim 15, wherein at least two of the bent links are interconnected with each other and at least one is a left bent link and at least one is a right bent link.

18. The debarking chain of claim 11, wherein the plurality of interconnected links are bent links; and wherein the first side section includes a weld and the bent links are selected from the group consisting of right bent links in which the opposing end sections are bent to the right of the weld and left bent links in which the opposing end sections are bent to the left of the weld.

19. A method of debarking tree logs, the method comprising the steps of:
a) providing a flail-type debarking machine for debarking tree logs; the flail-type debarking machine having a debarking drum;
b) providing flail-type debarking chain for attachment to the debarking drum; the debarking chain including a plurality of interconnected chain links including two end links and a plurality of intermediate links that interconnect with each other and the respective end links in series so that each of the end links are interconnected only with a single intermediate link; the debarking chain having first and second ends; each chain link being a continuous strand of chain material surrounding and defining a central opening through which the continuous strand of chain material of any adjacent, interconnected chain link passes; the plurality of interconnected chain links including at least two bent links; wherein each of the bent links have first and second opposing end sections spaced apart from one another by first and second side sections of the continuous strand of chain material; wherein each of the first and second opposing end sections reside generally within a plane; the first end section residing generally within a first plane and the second end section residing generally within a section plane; wherein each of the respective bent links is bent proximate both of the respective side sections such that the first plane resides at a bend angle with respect to the second plane of from about 5 to about 90 degrees;

c) attaching the debarking chain to the debarking drum; and d) debarking tree logs with the flail-type debarking machine.

20. The method of debarking tree logs of claim 19, wherein the debarking chain includes bent links selected from the group consisting of generally oblong links, generally square links and generally round links.

21. The method of debarking tree logs of claim 19, wherein the debarking chain includes bent links selected from the group consisting of passing links and non-passing links.

22. The method of debarking tree logs of claim 19, wherein the debarking chain includes at least two bent links interconnected in series with one another.

23. The method of debarking tree logs of claim 19, wherein the debarking chain includes bent links selected from the group consisting of right bent links and left bent links, wherein the first side section of each of bent link includes a weld portion positioned between first and second opposing end sections, wherein the weld portion is positioned to the right of the first end section and to the left of the second end section when the first side section is in a generally horizontal orientation and the first end section is position closest to a first end of the chain and the second end section is position closest to a second end of the chain; wherein both of the respective opposing end sections of a right bent link extend away from the weld portion to the right of the weld portion when the first side section and the second side section are oriented in a generally vertical orientation and the first end section and the first end are positioned above the weld portion and the second end section and the second end are position below the weld portion; and wherein both of the respective opposing end sections of a left bent link extend away from the weld portion to the left of the weld portion when the first side section and the second side section are oriented in a generally vertical orientation and the first end section and the first end are positioned above the weld portion and the second end section and the second end are position below the weld portion.

24. The method of debarking tree logs of claim 23, wherein the debarking chain includes at least two right bent links.

25. The method of debarking tree logs of claim 23, wherein at least two of the bent links are left bent links.

26. The method of debarking tree logs of claim 23, wherein at least two of the bent links are interconnected with each other and at least one is a left bent link and at least one is a right bent link.

27. The method of debarking tree logs of claim 19, wherein the plurality of interconnected links are bent links; and wherein the first side section includes a weld and the bent links are selected from the group consisting of right bent links in which the opposing end sections are bent to the right of the weld and left bent links in which the opposing end sections are bent to the left of the weld.

* * * * *